(12) United States Patent
Conner (10) Patent No.: US 9,796,448 B2
(45) Date of Patent: Oct. 24, 2017

(54) ADJUSTABLE BRAKE

(71) Applicant: Trek Bicycle Corporation, Waterloo, WI (US)

(72) Inventor: Andrew Conner, Madison, WI (US)

(73) Assignee: Trek Bicycle Corporation, Waterloo, WI (US)

( * ) Notice: Subject to any disclaimer, the term of this patent is extended or adjusted under 35 U.S.C. 154(b) by 0 days.

(21) Appl. No.: 14/740,215

(22) Filed: Jun. 15, 2015

(65) Prior Publication Data

US 2016/0068220 A1 Mar. 10, 2016

Related U.S. Application Data

(60) Provisional application No. 62/012,094, filed on Jun. 13, 2014.

(51) Int. Cl.
 B62L 1/16 (2006.01)
(52) U.S. Cl.
 CPC ............ B62L 1/16 (2013.01); *B62K 2206/00* (2013.01)
(58) Field of Classification Search
 USPC ................................ 188/24.12, 24.13, 24.19
 See application file for complete search history.

(56) References Cited

U.S. PATENT DOCUMENTS

| | | | | |
|---|---|---|---|---|
| 4,718,521 A * | 1/1988 | Hosokawa | ................ | B62L 1/12 188/24.19 |
| 5,649,609 A * | 7/1997 | Li | ............................ | B62L 1/14 188/2 D |
| 7,000,739 B2 * | 2/2006 | Ciamillo | .................. | B62L 1/06 188/2 D |
| 7,419,034 B1 * | 9/2008 | Wu | ........................... | B60T 1/06 188/24.12 |
| 8,061,487 B2 * | 11/2011 | Tsai | ....................... | B60T 11/046 188/2 D |
| 8,066,103 B2 * | 11/2011 | Edwards | .................. | B62L 1/16 188/24.12 |
| 8,096,392 B2 * | 1/2012 | Edwards | .................. | B62L 1/16 188/24.12 |
| 8,297,415 B2 * | 10/2012 | Edwards | .................. | B62L 1/16 188/24.12 |
| 2011/0290594 A1 * | 12/2011 | Tsai | ....................... | B60T 7/108 188/24.22 |
| 2013/0025979 A1 * | 1/2013 | Wehage | .................... | B62L 1/16 188/24.12 |

FOREIGN PATENT DOCUMENTS

| | | | | |
|---|---|---|---|---|
| DE | 2903191 A1 * | 7/1980 | ............... | B62L 1/16 |
| FR | 2758519 A3 * | 7/1998 | ............... | B62L 1/14 |

OTHER PUBLICATIONS

"Page de brake obscura . . . ", Printed Jun. 1, 2017, http://www.blackbirdsf.org/brake_obscura/mtb.html, 10 pages.
"The Verdict and TerraNaught", Printed Jun. 1, 2017, http://www.dkg-cnc.com/verdictpix.html, 7 pages.

* cited by examiner

*Primary Examiner* — Thomas J Williams (57) ABSTRACT

A brake apparatus including a bicycle structure, a first arm pivotably coupled to the bicycle structure, and a second arm pivotably coupled to the bicycle structure. A first lever can be pivotably coupled to the first arm. A quick release cam link can be pivotably coupled to the second arm. A second lever can be pivotably coupled to the first lever and pivotably coupled to the quick release cam link.

10 Claims, 10 Drawing Sheets

ADJUSTABLE BRAKE

CROSS-REFERENCE TO RELATED PATENT APPLICATIONS

This application claims the benefit of U.S. Provisional Application No. 62/012,094, titled Bicycle Brake, filed Jun. 13, 2014 which is incorporated herein by reference in its entirety.

BACKGROUND

The present invention relates generally to brakes and, more particularly, to an adjustable bicycle brake.

Lever-link type mechanisms have been used in the past to mechanically actuate brake pads on disc brakes. Over 30 years ago, Charlie Cunningham, a mountain bike pioneer, developed a powerful lever-link type rim brake adapted for bicycles. However, this lever-link design was not easily or quickly adjustable. Accordingly, improved lever-link type brakes are needed.

SUMMARY

One illustrative embodiment is directed to a brake apparatus. The brake apparatus can include a bicycle structure, a first arm pivotably coupled to the bicycle structure, and a second arm pivotably coupled to the bicycle structure. A first lever can be pivotably coupled to the first arm. A quick release cam link can be pivotably coupled to the second arm. A second lever can be pivotably coupled to the first lever and pivotably coupled to the quick release cam link.

Another illustrative embodiment is directed to a brake apparatus. The brake apparatus can include a bicycle structure, a first arm pivotably coupled to the bicycle structure, and a second arm pivotably coupled to the bicycle structure. A first lever can be pivotably coupled to the first arm. A second lever can be adjustably pivotably coupled to the first lever and pivotably coupled to the second arm.

These and various other features and advantages of the present invention will be made apparent from the following detailed description and the drawings.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION OF THE ILLUSTRATIVE EMBODIMENTS

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

Figure 1:
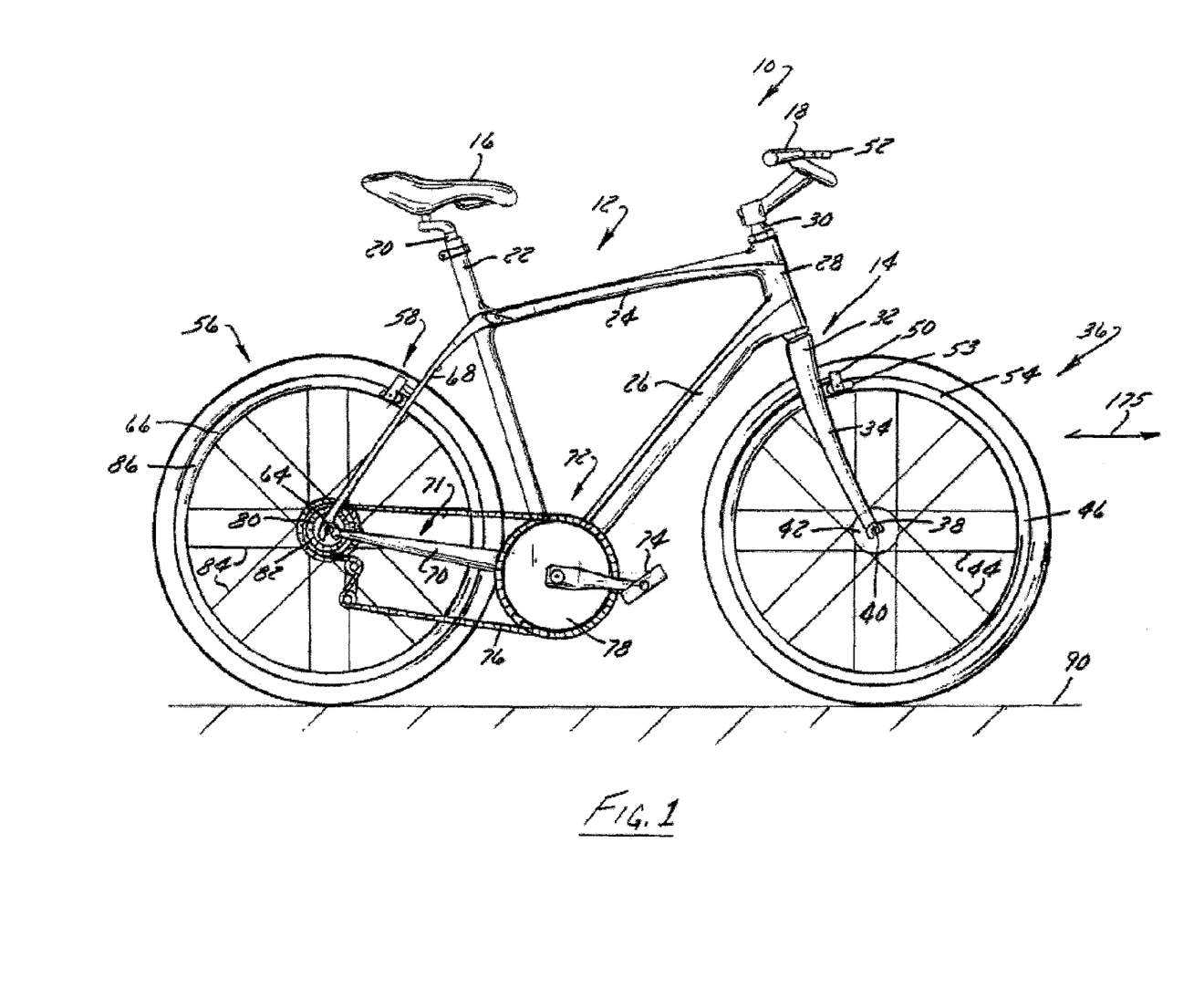
FIG. 1 is a side elevation view of a bicycle according to the present invention.

The present disclosure is directed to an enhanced bicycle braking surface and method of enhancing a bicycle braking surface. Referring to FIG. 1, a side view of a bicycle 10 in accordance with an illustrative embodiment is shown. The bicycle 10 can have a frame assembly 12. The bicycle 10 can include a seat 16 and handlebars 18 that are attached to frame assembly 12. A seat post 20 can be connected to seat 16 and can slidably engage a seat tube 22 of the frame assembly 12. A top tube 24 and a down tube 26 can extend forwardly from the seat tube 22 to a head tube 28 of the frame 12. Handlebars 18 can be connected to a stem or steer tube 30 that can pass through the head tube 28 and can be connected or integrally formed with a fork crown 32. The handlebar 18 can include a stem that is constructed to slidably engage an interior cavity of the steer tube 30. One or more of the structures of bicycle 10 and frame assembly 12 can be constructed from similar materials, a variety of different materials, and various combinations thereof. The frame assembly 12 and seat tube 22 can be formed of metal-type materials, such as steel, aluminum-type materials, fiber reinforced plastic, carbon fiber materials, and/or materials that are sufficiently formable and robust enough to support a rider of bicycle 10.

A fork assembly 14 can include a pair of fork blades or fork legs 34 that can extend from generally opposite ends of a fork crown 32 and can be constructed to support a front wheel assembly 36 at an end thereof or a dropout 38. The dropouts 38 can engage generally opposite sides of an axle 40 constructed to engage a hub 42 of the front wheel assembly 36. The hub 42 can be, for example, a freehub or a freewheel hub. A number of spokes 44 can extend from hub 42 to a rim 46 of the front wheel assembly 36. A tire 48 can be engaged with rim 46 such that rotation of the hub 42 and the rim 46, relative to the fork legs 34, rotates the tire 48. The rim 46 can be covered with a brake material, in part or in its entirety, to enhance braking characteristics.

The bicycle 10 can include a front brake assembly 50 having an actuator 52 attached to handlebars 18 and a pair of brake pads 53 positioned on generally opposite sides of front wheel assembly 36. The brake pads 53 can be constructed to engage a brake wall 54 of the rim 46 thereby providing a stopping or slowing force to front wheel assembly 36. A rear wheel assembly 56 can include a brake assembly 58 similar to the front wheel brake assembly 50. Brake assemblies 50, 58 can be any brake configuration such as, but not limited to, a rim brake or disk brake assembly wherein a rotor and a caliper are positioned proximate one or more of front wheel axle 40 or a rear axle 64, respectively. The rotor can be covered with a brake material, in part or in its entirety, to enhance braking characteristics. A rear wheel 66 can be positioned generally concentrically about rear axle 64.

A pair of seat stays 68 and a pair of chain stays 70, 71 can extend rearward relative to the seat tube 22 and the offset rear axle 64 from a crankset 72. The crank set 72 can include a set of pedals 74 that can be operationally connected to a flexible drive member such as a chain 76 via one or more variable diameter chain gears or a chain ring or sprocket 78. Rotation of chain 76 can communicate a drive force to a gear cluster 80 positioned proximate rear axle 64. The gear cluster 80 can be generally concentrically orientated with respect to the rear axle 64 and can include a number of variable diameter gears.

The gear cluster 80 can be operationally connected to a hub 82 of the rear wheel 66. The hub 82 can be, for example, a freehub or a freewheel hub. A number of spokes 84 can extend radially between the hub 82 and a rim 86 of rear wheel 66 of rear wheel assembly 56. The rim 86 can be covered with a brake material. Rider operation of the pedals 74 can drive the chain 76 thereby driving the rear wheel 66 which in turn propels the bicycle 10. The fork assembly 14 can be constructed to support a forward end 88 of the bicycle 10 above a ground surface 90. The handlebar 18 can be connected to the frame 12 and the fork assembly 14 such that operator manipulation of the handlebar 18 can be communicated to the fork assembly 14 to facilitate rotation of the front wheel assembly 36 relative to the frame assembly 12 along a longitudinal axis, indicated by arrow 175, of the bicycle 10. Manipulation of the handlebar 18 can steer the bicycle 10 during riding.

The construction of bicycle 10 depicted in FIG. 1 is merely exemplary of a number of bicycle configurations. Whereas bicycle 10 is shown as what is commonly understood as a street or road bike, the present disclosure is applicable to a number of bicycle configurations including those bicycles with more aggression suspension systems commonly found in off-road or mountain bike frame configurations, and/or hybrids, cross-over or multi-purpose bicycle frame configurations.

Figure 2:
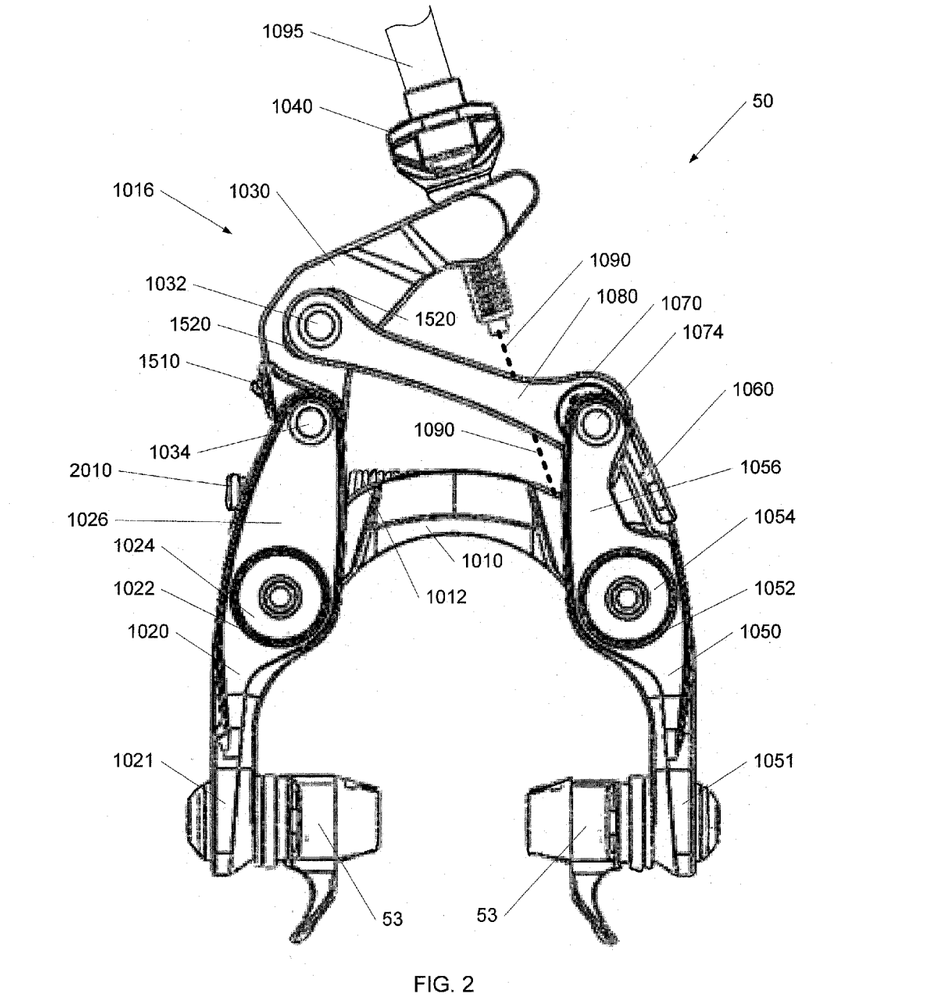
FIG. 2 is a front view of the brake of FIG. 1 in accordance with an illustrative embodiment.
Figure 3:
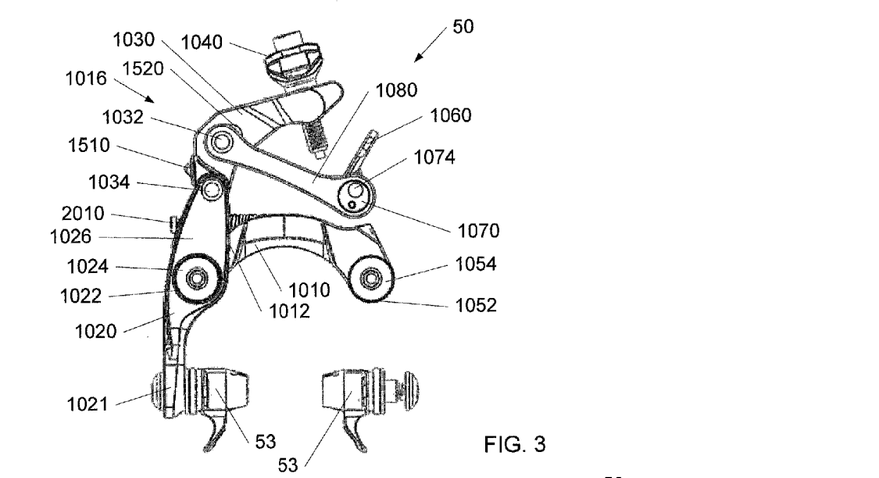
FIG. 3 is a front view of the brake of FIG. 2 in an open state with element 1050 removed for clarity in accordance with an illustrative embodiment.
Figure 4:
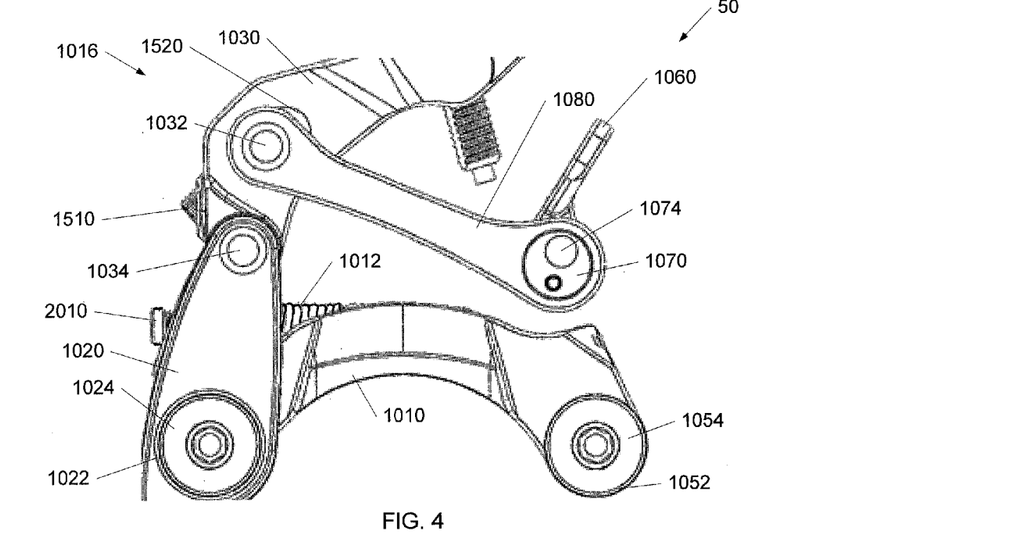
FIG. 4 is a front detail view of the brake of FIG. 2 in an open state with element 1050 removed for clarity in accordance with an illustrative embodiment.
Figure 5:
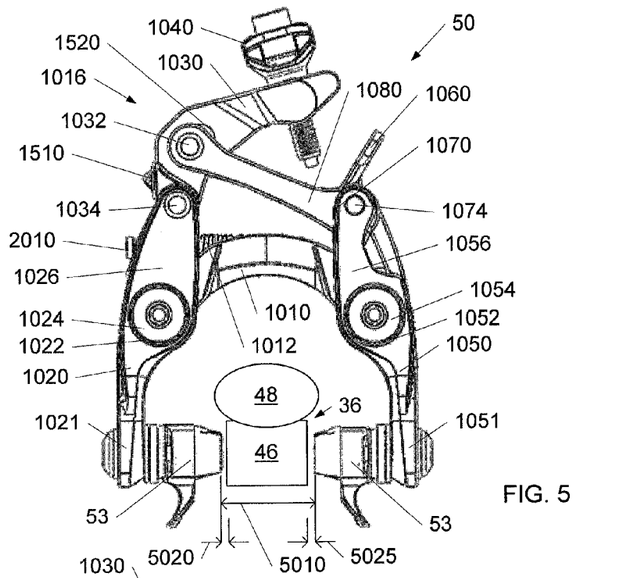
FIG. 5 is a front view of the brake of FIG. 2 in an open state in accordance with an illustrative embodiment.
Figure 6:
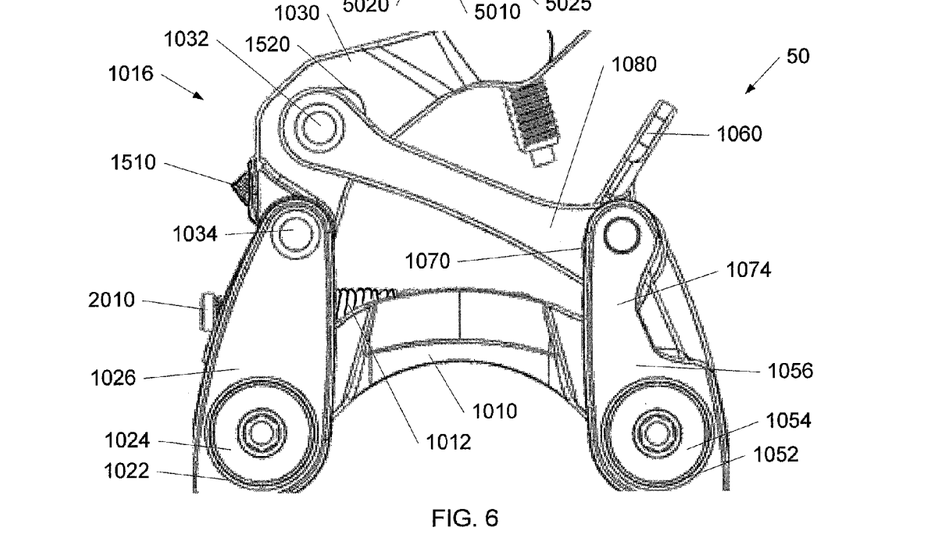
FIG. 6 is a front detail view of the brake of FIG. 2 in an open state in accordance with an illustrative embodiment.
Figure 7:
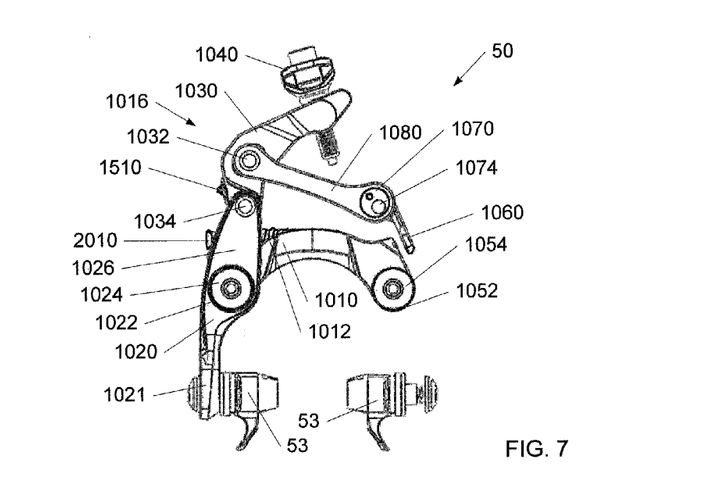
FIG. 7 is a front view of the brake of FIG. 2 in a closed state with element 1050 removed for clarity in accordance with an illustrative embodiment.
Figure 8:
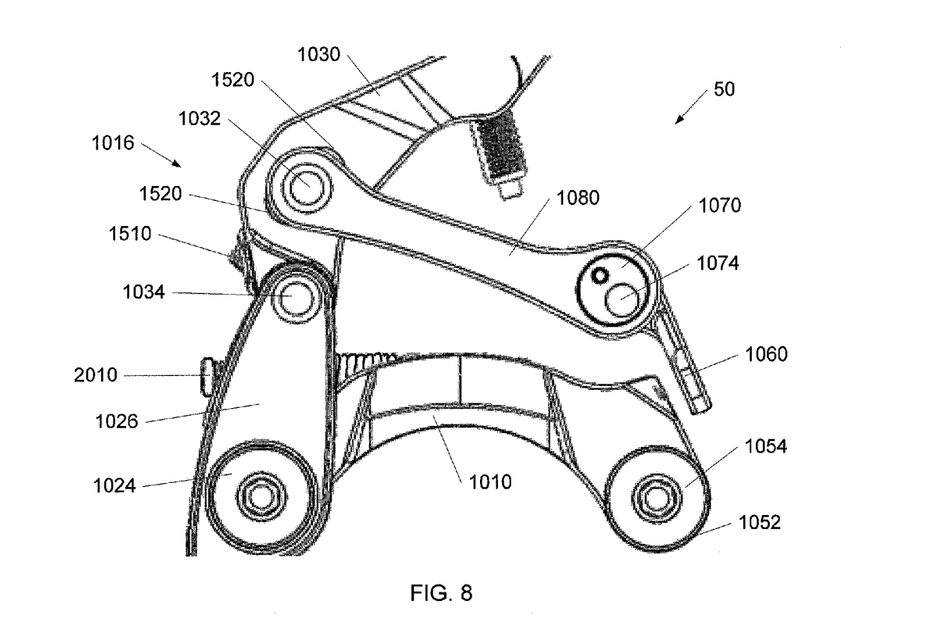
FIG. 8 is a front detail view of the brake of FIG. 2 in a closed state with element 1050 removed for clarity in accordance with an illustrative embodiment.
Figure 9:
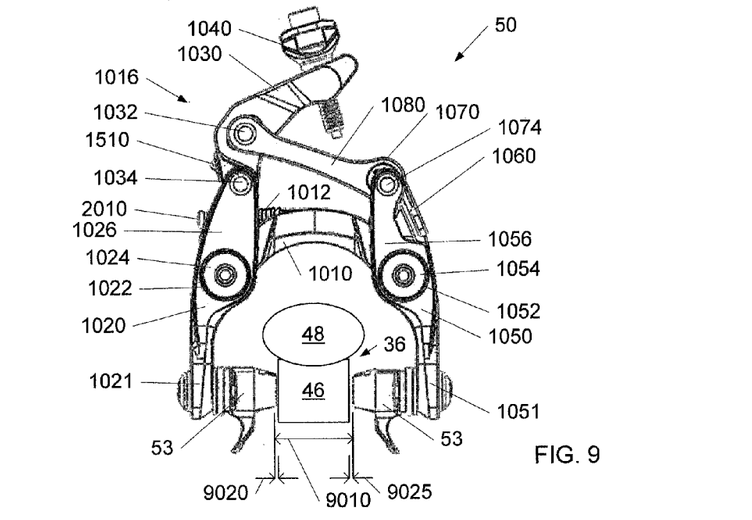
FIG. 9 is a front view of the brake of FIG. 2 in a closed state in accordance with an illustrative embodiment.
Figure 10:
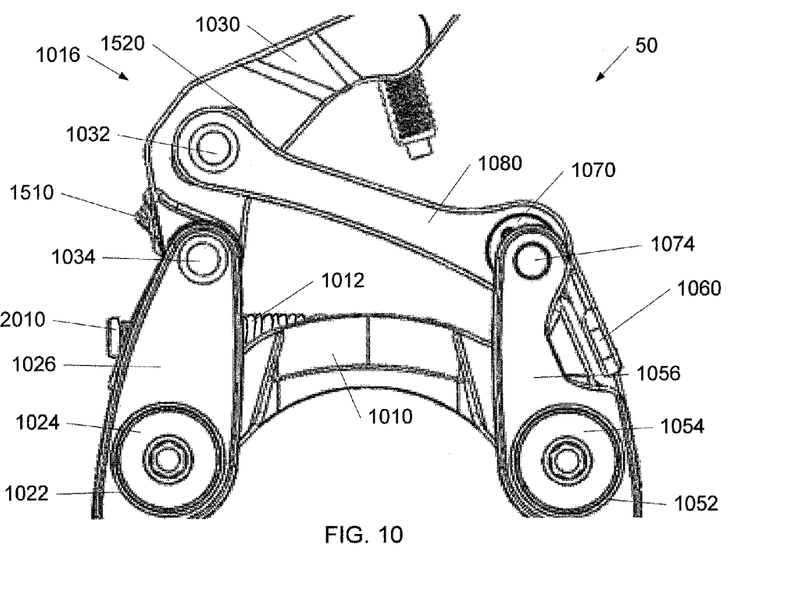
FIG. 10 is a front detail view of the brake of FIG. 2 in a closed state in accordance with an illustrative embodiment.
Figure 11:
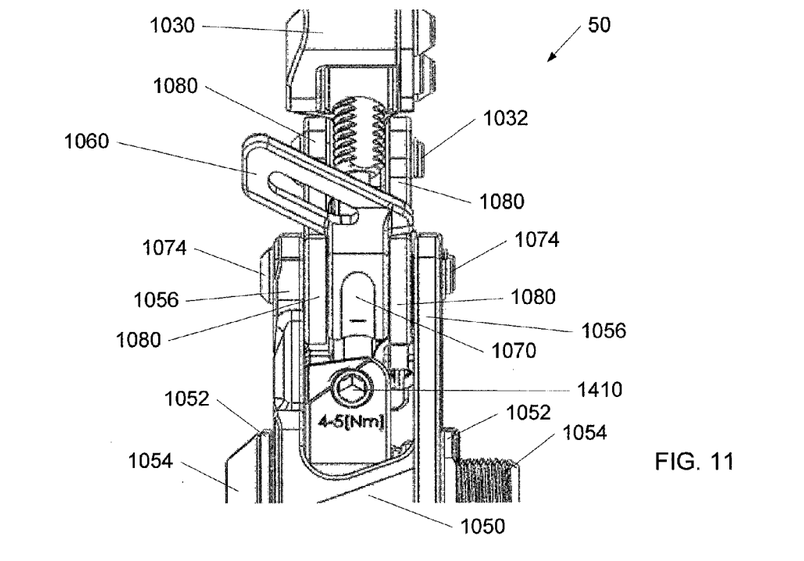
FIG. 11 is a right side view of the brake of FIG. 2 in an open state in accordance with an illustrative embodiment.
Figure 12:
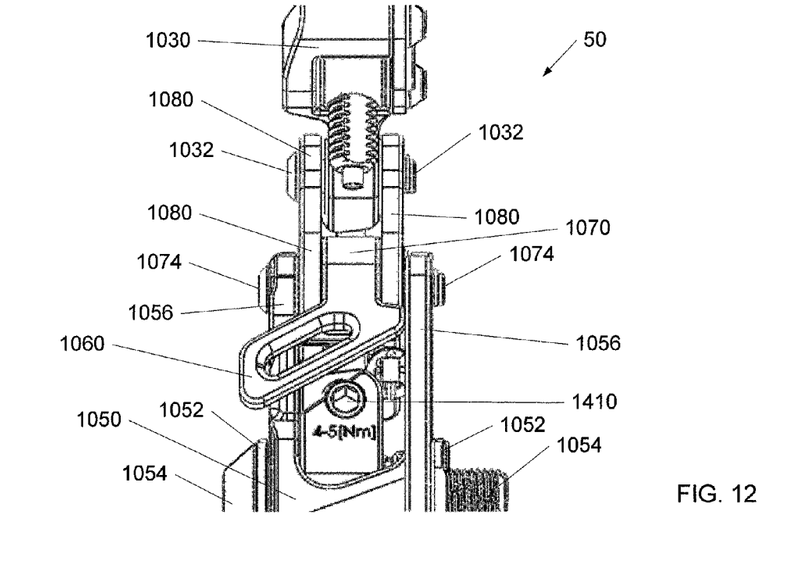
FIG. 12 is a right side view of the brake of FIG. 2 in a closed state in accordance with an illustrative embodiment.
Figure 13:
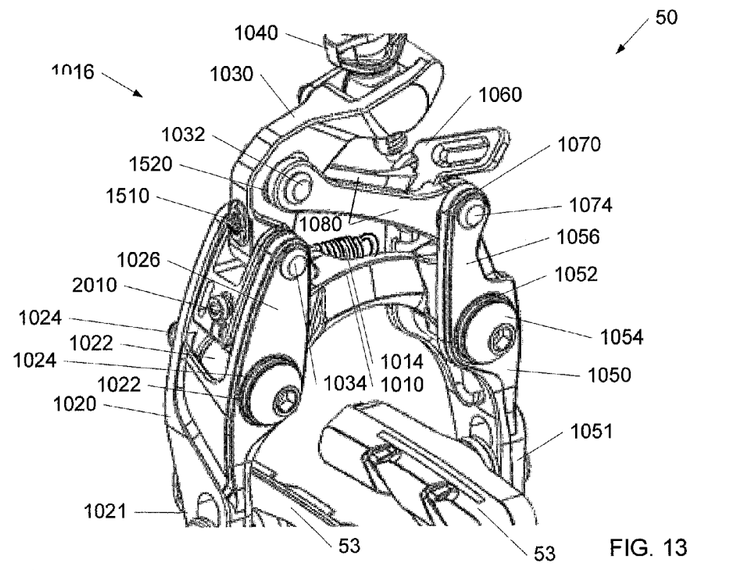
FIG. 13 is a right front perspective view of the brake of FIG. 2 in an open state in accordance with an illustrative embodiment.
Figure 14:
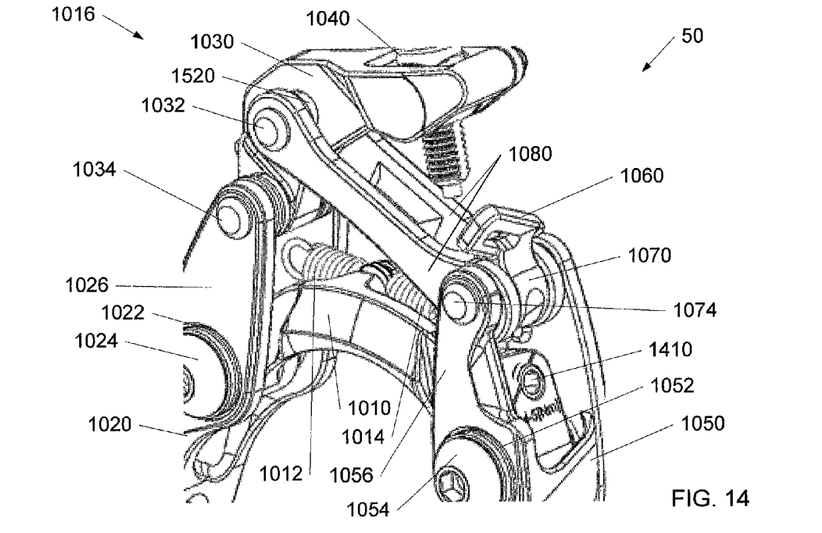
FIG. 14 is a left front perspective view of the brake of FIG. 2 in an open state in accordance with an illustrative embodiment.
Figure 15:
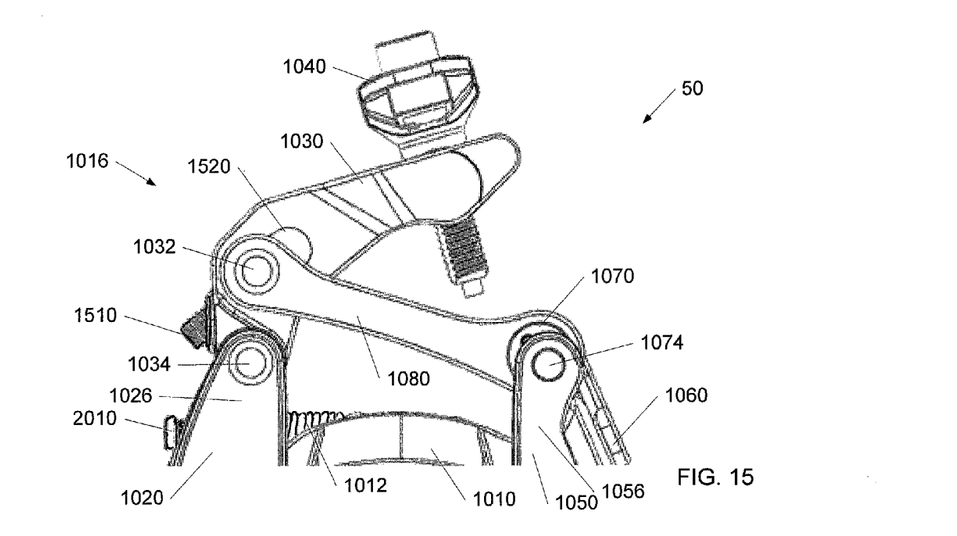
FIG. 15 is a front view of the lever-link mechanism of brake of FIG. 2 in a closed state and in a high leverage state in accordance with an illustrative embodiment.
Figure 16:
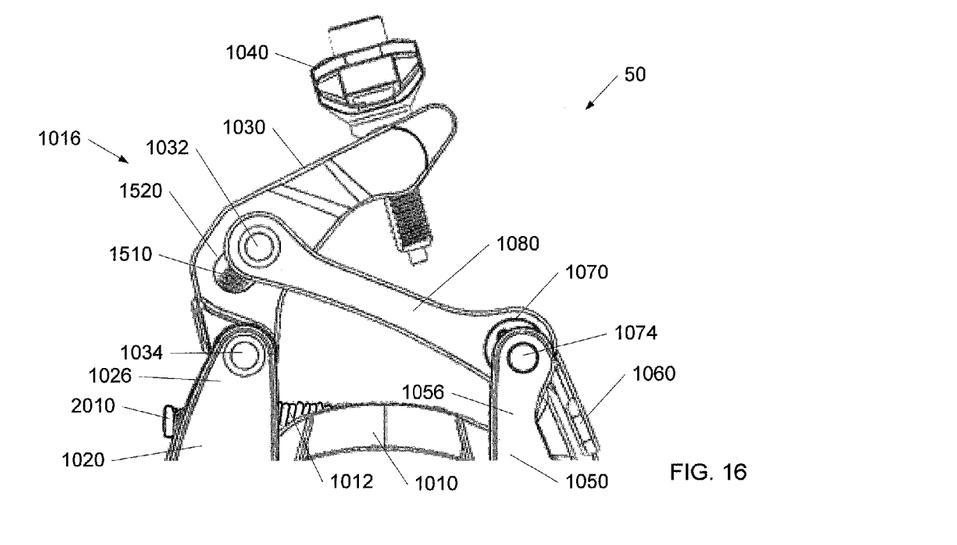
FIG. 16 is a front view of the lever-link mechanism of brake of FIG. 2 in a closed state and in a low leverage state in accordance with an illustrative embodiment.

Referring now to FIG. 2, a front view of the brake 50 (or 58) of FIG. 1 in accordance with an illustrative embodiment is shown. Referring to FIG. 3, a front view of the brake 50 of FIG. 2 in an open state with element 1050 removed for clarity in accordance with an illustrative embodiment is shown. Referring to FIG. 4, a front detail view of the brake 50 of FIG. 2 in an open state with element 1050 removed for clarity in accordance with an illustrative embodiment is shown. Referring to FIG. 5, a front view of the brake 50 of FIG. 2 in an open state in accordance with an illustrative embodiment is shown. Referring to FIG. 6, a front detail view of the brake 50 of FIG. 2 in an open state in accordance with an illustrative embodiment is shown. Referring to FIG. 7, a front view of the brake 50 of FIG. 2 in a closed state with element 1050 removed for clarity in accordance with an illustrative embodiment is shown. Referring to FIG. 8, a front detail view of the brake 50 of FIG. 2 in a closed state with element 1050 removed for clarity in accordance with an illustrative embodiment is shown. Referring to FIG. 9, a front view of the brake 50 of FIG. 2 in a closed state in accordance with an illustrative embodiment is shown. Referring to FIG. 10, a front detail view of the brake 50 of FIG. 2 in a closed state in accordance with an illustrative embodiment is shown. Referring to FIG. 11, a right side view of the brake 50 of FIG. 2 in an open state in accordance with an illustrative embodiment is shown. Referring to FIG. 12, a right side view of the brake 50 of FIG. 2 in a closed state in accordance with an illustrative embodiment is shown. Referring to FIG. 13, a right front perspective view of the brake 50 of FIG. 2 in an open state in accordance with an illustrative embodiment is shown. Referring to FIG. 14, a left front perspective view of the brake 50 of FIG. 2 in an open state in accordance with an illustrative embodiment is shown. Referring to FIG. 15, a front view of the lever-link mechanism 1016 of brake 50 of FIG. 2 in a closed state and in a high leverage state in accordance with an illustrative embodiment is shown. Referring to FIG. 16, a front view of the lever-link mechanism 1016 of brake 50 of FIG. 2 in a closed state and in a low leverage state in accordance with an illustrative embodiment is shown.

The brake 50 can be a lever-link type brake. The brake 50 can include a first arm 1020 and a second arm 1050 attached to the ends of a bridge 1010 by a first axle 1022 and second axle 1052, respectively. Hence, the bridge 1010 can float between the first axle 1022 and second axle 1052. The brake 50, 58 can be mounted to a fork (e.g., fork 14), seat stays, or chain stays by a first mounting bolt 1024 located through the first axle 1022 and a second mounting bolt 1054 located through the second axle 1052. Brake pads 53 can be attached to a first brake pad end 1021 of the first arm 1020 and a second brake pad end 1051 of the second arm 1050, respectively.

The bridge 1010 can support a first spring 1012 and a second spring 1014. The first spring 1012 can be attached to the first arm 1020. The second spring 1014 can be attached to the second arm 1050. In one embodiment, a single spring can be attached between the first arm 1020 and the second arm 1050. In another embodiment, the first spring 1012 and the second spring 1014 can be attached to a fork (e.g., fork 14). The tension on the first spring 1012 can be adjusted by screw 2010.

The first arm 1020 can be coupled to the second arm 1050 by a lever-link mechanism 1016. The lever-link mechanism 1016 can include a first lever 1030, a second lever 1080, and a quick release (QR) cam link 1070. The first lever 1030 can be attached to the second lever 1080 by an adjustable lever pivot 1032. In one embodiment, the adjustable lever pivot 1032 can be located at about the middle of the length of the first lever 1030. The first lever 1030 can be coupled to the first arm 1020 by a first arm pivot 1034 located at a first linking end 1026 of the first arm 1020. The first linking end 1026 can be opposite of the first brake pad end 1021 and separated by the first axle 1022. The second lever 1080 can be coupled to the first lever 1030 by a lever pivot with adjustment 1032.

In one embodiment, the QR cam link 1070 can rotate within, and can be retained at least in part by, the second lever 1080. The second arm 1020 can be coupled to the QR cam link 1070 by a second arm pivot 1074 located at a second linking end 1056 of the second arm 1050. The second linking end 1056 can be opposite of the second brake pad end 1051 and separated by the second axle 1052.

The quick release (QR) cam link 1070 can have a quick release (QR) lever 1060. The quick release (QR) cam link 1070 can be manipulated by the QR lever 1060. The second arm pivot 1074 can be offset from a center of rotation of the QR cam link 1070.

A cable 1090 can be attached to the bridge 1010 by capturing mechanism 1410; and a cable housing 1095 of the cable 1090 (i.e., a Bowden-style cable) can be coupled to a cable housing collar 1040 on the first lever 1030. When the cable 1090 is tightened (by e.g., actuator 52), the first lever 1030 can pull toward the bridge 1010 causing the first arm 1020 and second arm 1050 to spread above the first axle 1022 and second axle 1052; thereby causing the brake pads 53 to move towards each other below the first axle 1022 and second axle 1052. When the cable 1090 is loosened (by e.g., actuator 52), the first lever 1030 can slack from the bridge 1010 (biased by springs 1012, 1014) causing the first arm 1020 and second arm 1050 to tighten above the first axle 1022 and second axle 1052; thereby causing the brake pads 53 to move away from each other below the first axle 1022 and second axle 1052.

The quick release (QR) cam link 1070 with quick release (QR) lever 1060 can allow a rider to increase a pad-to-rim gap (5020, 5025, 9020, and 9025) for additional clearance or wheel changes. This feature can allow rider to easily use the brake in either an open or closed quick release (QR) cam 1070 position. Referring in particular to FIGS. 5 and 6, when the QR cam 1070 is in the open position, the brake pads 53 are spread apart an open distance 5010 leaving ample room around the front wheel assembly 36 for removal such that the open distance 5010 is large enough that the tire 48 may fit past the brake pads 53. Referring in particular to FIGS. 9 and 10, when the QR cam 1070 is in the closed position, the brake pads 53 are spread apart a closed distance 9010 so that the brake pads 53 are near a rim 46 of the front wheel assembly 36 such that the brake is properly adjusted. The closed distance 9010 is smaller than the open distance 5010.

The first lever 1030 can include an oblong opening 1520. The adjustable lever pivot 1032 can slide back and forth in the oblong opening 1520. A jack screw 1510 can be rotably coupled to the adjustable lever pivot 1032. The jack screw 1510 can be threaded into a threaded opening (not shown) in the first lever 1030. When the jack screw 1510 is turned the adjustable lever pivot 1032 moves in the oblong opening 1520 thereby changing the pivot point of the second lever 1080 relative to the first lever 1030.

Brake system performance is generally a function of the leverage of both the brake and brake lever. Brake levers and brakes vary in leverage between brands. The ability to adjust the leverage of the brake using adjustable lever pivot 1032 allows the user to match the "system leverage" of other popular brands with a variety of brake levers. The adjustable lever pivot 1032 can allow the user to adjust the leverage ratio of the brake to meet manufacturers' braking system leverage recommendations for different brake levers. For example, manufacturers' brake systems are not generally compatible. Moving the adjustable lever pivot 1032 allows the user to match the brake 50 to a brake lever (i.e., actuator 52).

Further, the user can maintain consistent system leverage with different wheel widths. A brake's power is generally a function of its geometry. The brake geometry and resulting power are a function of the rim width, with narrow rims producing a higher braking power. Being able to adjust the brake geometry using adjustable lever pivot 1032 allows users to fine tune their braking output.

In addition, the user can easily bias braking power front to rear by adjusting the adjustable lever pivot 1032. The forward shift of the riders' weight during braking reduces the amount of braking that can be achieved with the rear wheel before causing it to skid. Being able to bias the power of the front and rear brakes using adjustable lever pivot 1032 allows a rider to put equal power into the brake levers with a more controlled distribution of braking front to rear. Reducing the power of the rear brake using adjustable lever pivot 1032 will effectually increase the modulation range of the rear brake, allowing a more usable range before the wheel locks up.

Users' preference often varies regarding the "feel" at the lever (i.e., actuator 52). Prior to contacting the rim, the feel at the lever is a result of the cable drag and the strength of the brake's return spring (and the brake leverage overcoming the spring). Once the pads have contacted the rim, feedback at the lever is typically a function of the stiffness of the braking system, which includes the brake, housing, and brake lever. The stiffness of the brake assembly is a function of the brake's leverage and the stiffness of the brake arms. For example, if the same force were applied to a more powerful brake, the arms will deflect more due to a higher mechanical advantage. With the arm stiffness fixed, users can still increase the stiffness at the brake lever by decreasing the power of their brake using adjustable lever pivot 1032. The decreased brake power will also produce the effect of a stronger spring feel, since there is less mechanical advantage overcoming the spring at a lower leverage ratio.

Riders often refer to the modulation of the brake, or the ability to comfortably control the output of the brake across the full range of braking force. A brake that exhibits good modulation will have predictable output across the full range of power, from feathering the brakes to locking up the front wheel. Poor modulation is often the result of having a brake with fixed power being used with a variety of brake pads and rims with varying performance. A powerful brake which produces necessary braking performance on a carbon rim with carbon-specific brake pads might feel "grabby" on an alloy rim with alloy-specific pads. Being able to set the upper end of your braking power using adjustable lever pivot 1032 based on all external factors allows a user to optimize the braking system's range of modulation.

Figure 17:
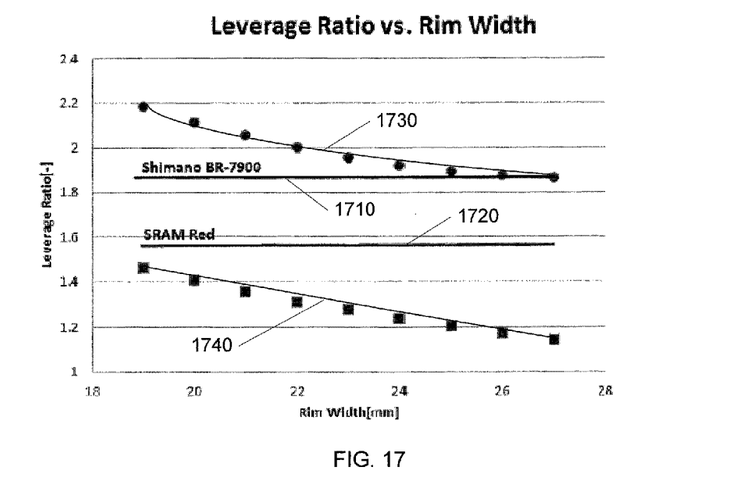
FIG. 17 is a graph of leverage ratio to rim width (mm) in accordance with an illustrative embodiment.

Referring now to FIG. 17, a graph of leverage ratio to rim width (mm) in accordance with an illustrative embodiment is shown. The leverage ratio is defined as the amount of pad movement versus the amount of pull needed. Curve 1710 shows a leverage ratio for a Shimano™ BR-7900 brake set. Curve 1720 shows a leverage ratio for a SRAM™ Red brake set. Curve 1730 shows a high leverage ratio bound for an embodiment of the brake 50 of FIG. 2. Curve 1740 shows a low leverage ratio bound for the embodiment of the brake 50 of FIG. 2. Thus, brake 50 can be adjusted to accommodate both Shimano™ BR-7900 brake levers and SRAM™ Red brake levers over a variety of rim widths.

Figure 18:
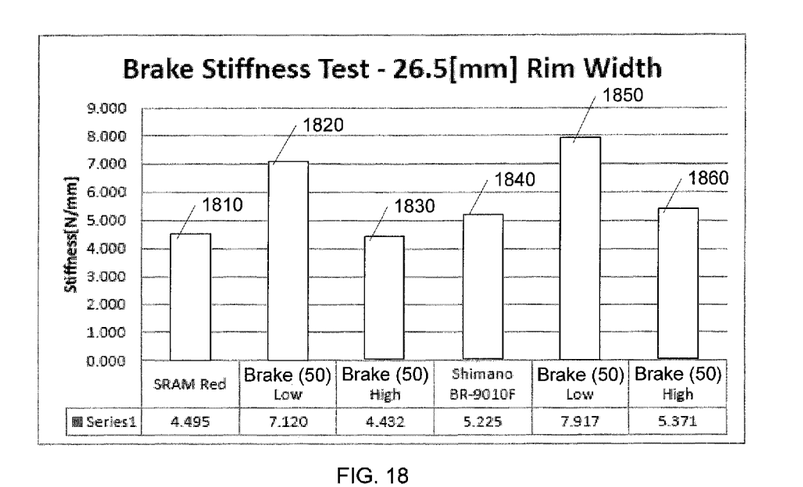
FIG. 18 is a graph of brake stiffness (N/mm) for various brakes and brake setups in accordance with an illustrative embodiment.

Referring now to FIG. 18, a graph of brake stiffness (N/mm) for various brakes and brake setups in accordance with an illustrative embodiment is shown. The stiffness was measured using a 26.5 mm wide rim. Histogram 1810 shows the brake stiffness for a SRAM™ Red brake set. Histogram 1820 shows the brake stiffness for an embodiment of the brake 50 of FIG. 2 adjusted to the lowest leverage ratio and using a lever from a SRAM™ Red brake set. Histogram 1830 shows the brake stiffness for an embodiment of the brake 50 of FIG. 2 adjusted to the highest leverage ratio and using a lever from a SRAM™ Red brake set. Histogram 1840 shows the brake stiffness for a Shimano™ BR-7900 brake set. Histogram 1850 shows the brake stiffness for the embodiment of the brake 50 of FIG. 2 adjusted to the lowest leverage ratio and using a lever from a Shimano™ BR-7900 brake set. Histogram 1860 shows the brake stiffness for an embodiment of the brake 50 of FIG. 2 adjusted to the highest leverage ratio and using a lever from a Shimano™ BR-7900 brake set.

One or more flow diagrams may have been used herein. The use of flow diagrams is not meant to be limiting with respect to the order of operations performed. The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from, the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. A brake apparatus, comprising:
a bicycle structure;
a first arm pivotably coupled to the bicycle structure;
a second arm pivotably coupled to the bicycle structure;
a first lever pivotably coupled to the first arm;
a quick release cam link pivotably coupled to the second arm about a first axis of rotation; and
a second lever pivotably coupled to the first lever and pivotably coupled to the quick release cam link about a second axis of rotation;
wherein the first axis of rotation is offset from the second axis of rotation.

2. The brake apparatus of claim 1, wherein the bicycle structure is a fork.

3. The brake apparatus of claim 1, wherein the bicycle structure is a pair of seat stays.

4. The brake apparatus of claim 1, wherein the second lever is adjustably pivotably coupled to the first lever.

5. The brake apparatus of claim 4, wherein a location of an adjustable lever pivot of the second lever is configured to move relative to a first end of the first lever and a second end of the first lever.

6. The brake apparatus of claim 1, wherein the quick release cam link comprises a lever configured to be manipulated by a user.

7. The brake apparatus of claim 1, further comprising a cable sheathed by a cable housing, wherein the cable housing is coupled to the first lever.

8. The brake apparatus of claim 7, further comprising a bridge floated between the pivot of the first arm and the pivot of the second arm, and wherein the cable is attached to the bridge.

9. The brake apparatus of claim 1, further comprising at least one spring configured to tension the first arm and the second arm.

10. The brake apparatus of claim 1, further comprising a first brake pad attached to the first arm and a second brake pad attached to the second arm.

\* \* \* \* \*